(12) United States Patent
Zanon et al.

(10) Patent No.: US 12,509,276 B2
(45) Date of Patent: Dec. 30, 2025

(54) OPENING DEVICE FOR A PACKAGE, MOLD FOR MOLDING AN OPENING DEVICE FOR A PACKAGE AND PACKAGE HAVING AN OPENING DEVICE

(71) Applicant: TETRA LAVAL HOLDINGS & FINANCE S.A., Pully (CH)

(72) Inventors: Paolo Zanon, Modena (IT); Anna Rosa Vietri, Modena (IT); Pietro Martini, Parma (IT); Massimo Sassi, Parma (IT); Francesca Tavoni, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/688,380

(22) PCT Filed: Sep. 20, 2022

(86) PCT No.: PCT/EP2022/076022
§ 371 (c)(1),
(2) Date: Mar. 1, 2024

(87) PCT Pub. No.: WO2023/052182
PCT Pub. Date: Apr. 6, 2023

(65) Prior Publication Data
US 2024/0383639 A1    Nov. 21, 2024

(30) Foreign Application Priority Data
Sep. 30, 2021   (EP) ..................................... 21200031

(51) Int. Cl.
*B65D 5/74*     (2006.01)
*B65D 17/50*    (2006.01)

(52) U.S. Cl.
CPC ........... *B65D 5/747* (2013.01); *B65D 17/507* (2013.01); *B65D 2251/0093* (2013.01)

(58) Field of Classification Search
CPC ................. B65D 5/747; B65D 17/507; B65D 2251/0015; B65D 47/2043;
(Continued)

(56) References Cited

U.S. PATENT DOCUMENTS 5,735,426 A *   4/1998   Babcock ................ B65D 5/746
                                             215/354
10,954,023 B2 *   3/2021   Winberg ................ B65D 5/065
(Continued)

FOREIGN PATENT DOCUMENTS

EP        1813410 A1    8/2007
JP        H0885563 A    4/1996
(Continued)

OTHER PUBLICATIONS

Communication with Search Report dated Mar. 18, 2022 issued by the European Patent Office in corresponding European Patent Application No. 21200031.9-1017. (8 pages).

(Continued)

*Primary Examiner* — Anthony D Stashick
*Assistant Examiner* — Symren K Sanghera
(74) *Attorney, Agent, or Firm* — BUCHANAN INGERSOLL & ROONEY PC

(57) ABSTRACT

There is described an opening device for a package having a designated pour opening and being filled with a pourable product. The opening device comprises a contact portion and a closing element detachably and/or rupturably attached to the contact portion and configured to close the designated pour opening. The closing element comprises a central main wall and a plurality of leg elements connected to and extending from the central main wall. The central main wall (Continued)

comprises a plurality of radially extending ridge elements, each one being interposed between one respective leg element and a center of the central main wall and a plurality of grooves, each one extending between one respective pair of leg elements.

15 Claims, 4 Drawing Sheets

(58) Field of Classification Search
CPC ............ B65D 47/2012; B65D 75/5811; B65D 75/5822; B65B 43/285
USPC ................ 220/277, 265, 270, 269, 257.2
See application file for complete search history.

(56) References Cited

U.S. PATENT DOCUMENTS

| | | | |
|---|---|---|---|
| 2008/0315452 A1* | 12/2008 | Martini | ............. B29C 45/14344 425/290 |
| 2019/0329938 A1 | 10/2019 | Krautkrämer | |
| 2021/0163176 A1 | 6/2021 | Martini et al. | |
| 2023/0127158 A1* | 4/2023 | Morciano | .......... B65D 47/0876 222/556 |
| 2023/0137895 A1* | 5/2023 | Morciano | ............ B65D 51/228 222/528 |
| 2023/0356888 A1* | 11/2023 | Zanon | .................... B65D 5/746 |
| 2024/0383639 A1* | 11/2024 | Zanon | ................. B29C 45/0081 |
| 2024/0391657 A1* | 11/2024 | Zanon | ................. B29C 45/0081 |

FOREIGN PATENT DOCUMENTS

| | | |
|---|---|---|
| JP | 2010173705 A | 8/2010 |
| WO | 0125106 A1 | 4/2001 |

OTHER PUBLICATIONS

International Search Report (PCT/ISA/210) and Written Opinion (PCT/ISA/237) mailed on Jan. 9, 2023 by the European Patent Office as the International Searching Authority for International Application No. PCT/EP2022/076022. (12 pages).

U.S. Appl. No. 18/690,794, filed Mar. 11, 2024, Paolo Zanon et al.

* cited by examiner

OPENING DEVICE FOR A PACKAGE, MOLD FOR MOLDING AN OPENING DEVICE FOR A PACKAGE AND PACKAGE HAVING AN OPENING DEVICE

TECHNICAL FIELD

The present invention relates to an opening device for a package, in particular a package having a main body, filled with a pourable product, even more particular filled with a pourable food product.

Furthermore, the present invention also relates to a mold for molding an opening device for a package, in particular a package having a main body, filled with a pourable product, even more particular filled with a pourable food product.

Advantageously, the present invention also relates to a package, in particular a package having a main body, filled with a pourable product, even more particular filled with a pourable food product, and comprising an opening device.

BACKGROUND ART

As is known, many liquid or pourable food products, such as fruit juice, milk, milk-based drinks, drinking yoghurt, wine, tomato sauce, salt, sugar, etc., are sold in packages, in particular sealed packages, made of a sterilized packaging material.

A typical example is the parallelepiped-shaped package for pourable food products known as Tetra Brik Aseptic (registered trademark), which is made by sealing and folding a laminated strip packaging material. The packaging material has a multilayer structure comprising a carton and/or paper base layer, covered on both sides with layers of heat-seal plastic material, e.g. layers of polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Thus, such a type of package comprises a main body formed from a multilayer packaging material and has a designated pour opening, which allows the outpouring of the pourable product from the package, and an opening device arranged about the designated pour opening. The opening device is designed to seal the package prior to a first opening of the opening device.

It is furthermore known that the main body may be obtained from a packaging blank of a multilayer packaging material, the packaging blank having the designated pour opening being covered by a sealing membrane of an oxygen-barrier material.

One technological solution for providing the final package with the opening device is based on molding the opening device onto the packaging blank and to manipulate the packaging blank after the molding of the opening device so as to obtain the final package.

It must be noted that the molding of the opening device onto the packaging blank must occur such that the separation membrane adheres to portions of the opening device such that the separation membrane faces away from an inner space of the package once the package has been formed.

Even though the currently known opening devices provide for good results, a need is felt in the sector to further improve the opening devices and/or packages, in particular so as to facilitate the molding of the opening devices.

DISCLOSURE OF INVENTION

It is therefore an object of the present invention to provide in a straightforward and low-cost manner an improved opening device for a package, in particular a package having a main body formed from a multilayer packaging material, filled with a pourable product, even more particular filled with a pourable food product.

In particular, it is an object of the present invention to provide in a straightforward and low-cost manner an improved opening device for a package, in particular a packaging having a main body formed from a multilayer packaging material, filled with a pourable product, even more particular filled with a pourable food product, which facilitates the molding of the opening device onto the package and/or a precursor of the package.

It is another object of the present invention to provide in a straightforward and low-cost manner a mold for molding an opening device, in particular allowing to come along with a facilitated molding process.

It is a further object of the present invention to provide in a straightforward and low-cost manner a package, in particular a package having a main body formed from a multilayer packaging material, filled with a pourable product, in particular filled with a pourable food product, having an opening device, in particular an opening device whose molding onto the package and/or a precursor of the package is facilitated.

According to the present invention, there is provided an opening device according to the independent claim.

Further advantageous embodiments of the opening device are specified in the claims directly or indirectly depending on claim 1.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
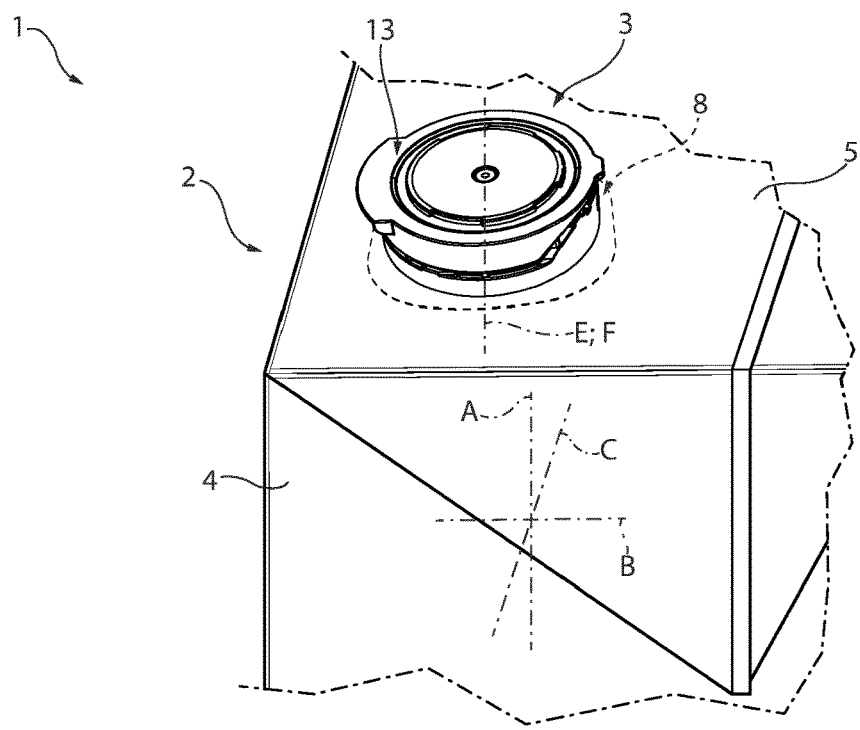
FIG. 1 is a schematic perspective view of a portion of a package having an opening device according to the present invention, with parts removed for clarity.

Number 1 indicates as a whole a package (only partially shown to the extent necessary for the comprehension of the present invention) comprising:

a main body 2, in particular a main body 2 formed from a multilayer packaging material, being filled and/or being fillable with a pourable product, in particular a pourable food product, and in particular having a designated pour opening (not shown and known as such) configured to allow for an outflow of the pourable product from main body 2; and an opening device 3, in particular formed from a polymer material, coupled to main body 2 about the designated pour opening and configured to seal the designated pour opening and to be controllable so as to open the designated pour opening and to allow for the outpouring of the pourable product.

The pourable product may be milk, tomato sauce, milk-based drinks, drinking yoghurt, water, sugar, salt, juices, emulsions, and the like.

According to some preferred non-limiting embodiments, the packaging material may comprise at least a layer of fibrous material, such as e.g. a paper or cardboard layer, and at least two layers of heat-seal plastic material, e.g. polyethylene layers, interposing the layer of fibrous material in between one another. One of these two layers of heat-seal plastic material may define the inner face of main body 2 contacting the pourable product.

Preferably, the packaging material may also comprise a layer of gas- and light-barrier material, e.g. aluminum foil or ethylene vinyl alcohol (EVOH) film, in particular being arranged between one of the layers of heat-seal plastic material and the layer of fibrous material. Preferentially but not necessarily, the packaging material may also comprise a further layer of heat-seal plastic material being interposed between the layer of gas- and light-barrier material and the layer of fibrous material.

Preferentially, each package 1, in particular the respective main body 2, may be obtained from a respective blank of the multilayer packaging material. In particular, the blank may define a precursor of the respective package 1, in particular the respective main body 2.

In more detail, the respective blank may comprise the respective designated pour opening, which in particular may be covered by a separation membrane. The separation membrane may be formed from a gas-barrier material, in particular the separation membrane may be defined by a portion of the layer of the gas- and light-barrier material.

According to some preferred non-limiting embodiments, the multilayer packaging material may be provided in the form of a web, thereby the packaging blanks may be successively arranged with respect to one another. During the formation of packages 1, the web is formed into a tube, longitudinally sealed, filled with the pourable product and transversally sealed and cut in correspondence with the extensions of the packaging blanks.

According to a preferred non-limiting embodiment, each opening device 3 may be applied, in particular molded, to the respective main body 2 or onto the respective packaging blank. Preferentially, each opening device 3 may be molded onto the respective packaging blank and about the designated pour opening. In particular and as will be explained further below, a first portion of opening device 3 may be molded onto the respective packaging blank and a second portion may be applied onto the first portion after molding of the first portion.

Figure 2:
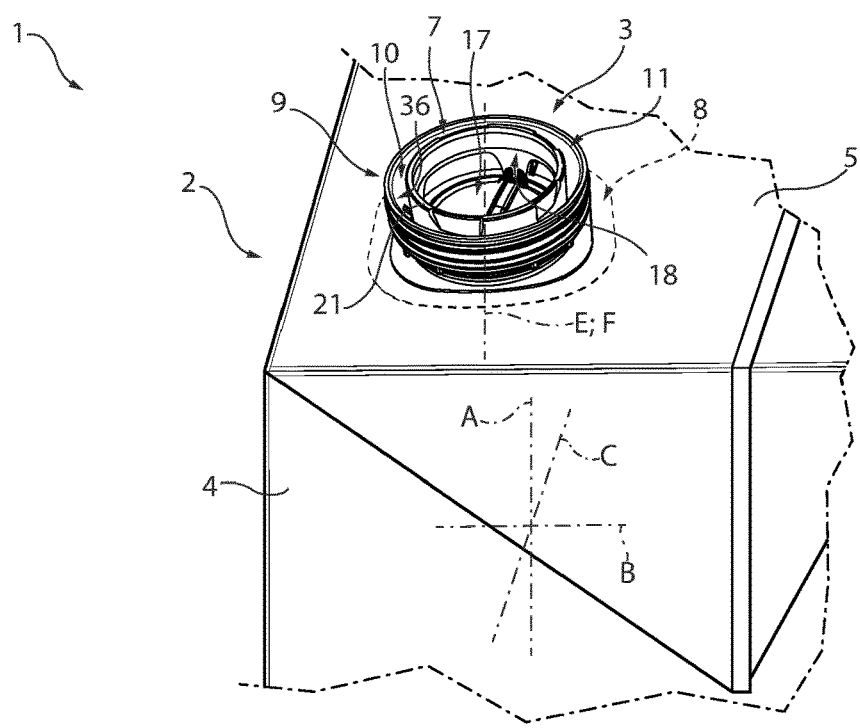
FIG. 2 is a perspective view of the package of FIG. 1 and focusing on a detail of the opening device of FIG. 1, with parts removed for clarity.
Figure 3:
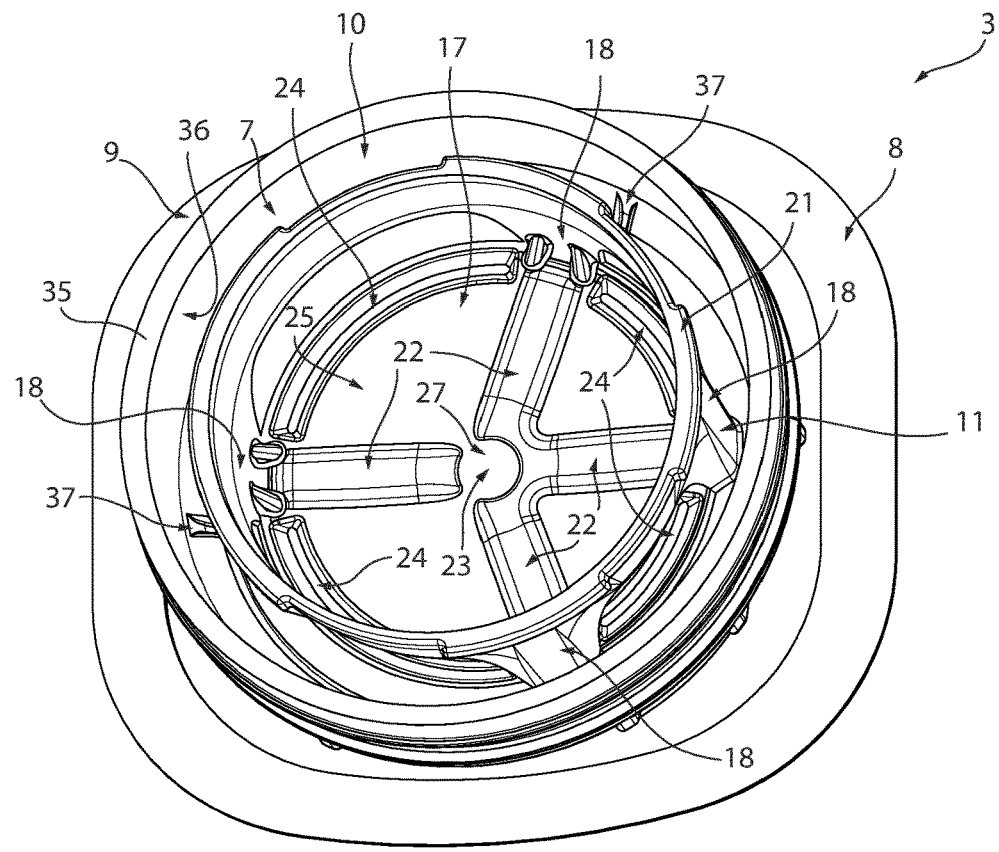
FIG. 3 is an enlarged perspective view of the detail of the opening device of FIG. 2, with parts removed for clarity.
Figure 4:
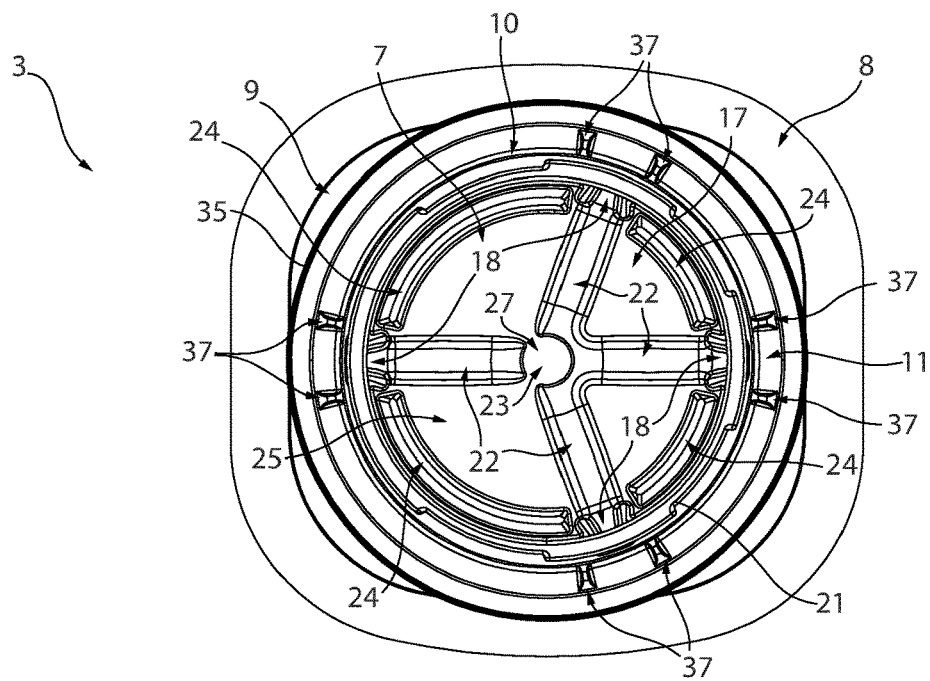
FIG. 4 is a top view of the detail of FIG. 3, with parts removed for clarity.
Figure 5:
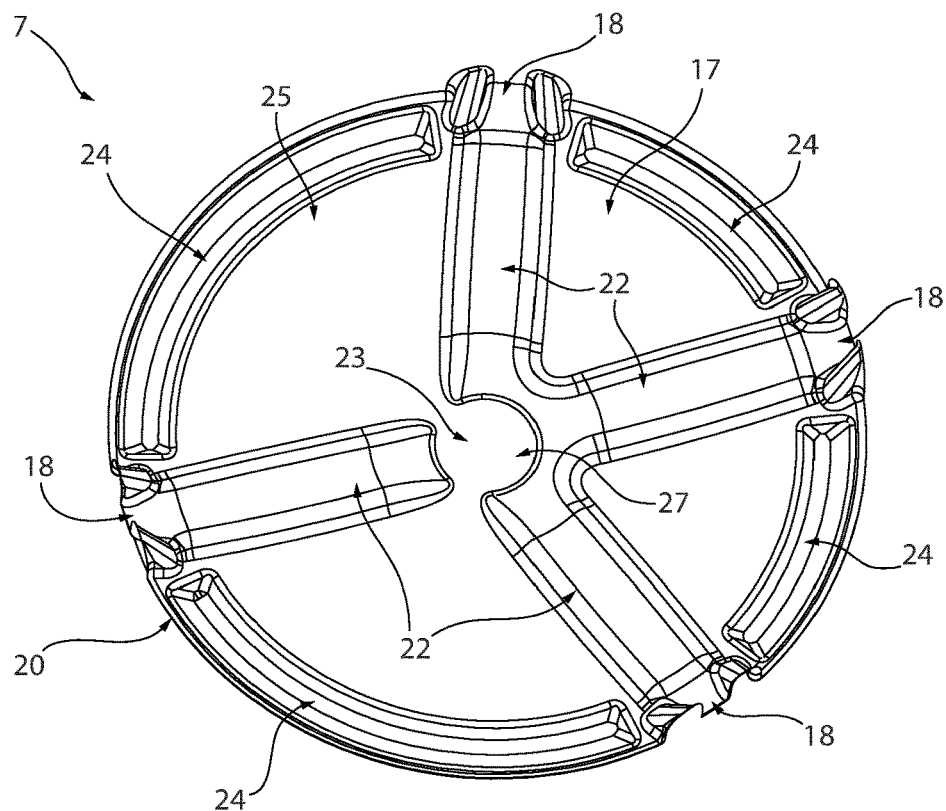
FIG. 5 is an enlarged perspective view of a portion of the detail of FIGS. 2, 3 and 4, with parts removed for clarity.

With particular reference to FIGS. 1 and 2, main body 2 may extend along a longitudinal axis A, a first transversal axis B perpendicular to longitudinal axis A and a second transversal axis C perpendicular to first transversal axis B and longitudinal axis A. In particular, the extension of package 2 along longitudinal axis A may be larger than the extension of package 2 along first transversal axis B and second transversal axis C.

Preferentially, main body 2 may be parallelepiped-shaped.

According to some preferred non-limiting embodiments, main body 2 may comprise a first wall (not shown and known as such), in particular being transversal, even more particular perpendicular, to longitudinal axis A, from which main body 2 may extend along longitudinal axis A. Preferably, the first wall may define a support surface of package 1, in particular main body 2, which may be designed to be put in contact with a support, such as e.g. a shelf, when, in use, being e.g. exposed within a sales point or when being stored. In particular, when being arranged on the support the first wall may define a bottom wall.

Preferably, main body 2 may also comprise a side wall 4 being (fixedly) connected to the first wall and extending, in particular substantially parallel, along longitudinal axis A, from the first wall.

Preferentially, main body 2 may also comprise a second wall 5 opposite to the first wall and being (fixedly) connected to side wall 4. In particular, side wall 4 may be interposed between the first wall and second wall 5.

In particular, when package 1 is arranged on a support second wall 5 may define a top wall.

According to the shown non-limiting embodiment, the first wall and second wall 5 may be parallel to one another.

According to non-limiting alternative embodiments not shown, the first wall and second wall 5 may be inclined with respect to one another. In particular, second wall 5 may define a slanted top or may define a portion of a gable-top.

According to some non-limiting embodiments, second wall 5 may carry and/or comprise the designated pour opening.

According to some preferred non-limiting embodiments, package 1, in particular main body 2, may comprise an inner space configured to contain and/or containing the pourable product. In particular, the first wall, side wall 4 and second wall 5 may delimit the inner space.

With particular reference to FIGS. 2 to 7, opening device 3 may comprise a contact portion 6, in particular an annular contact portion 6, and a closing element 7 detachably and/or rupturably attached to, in particular fixed to, contact portion 6 and configured to close, in particular also to seal, the designated pour opening.

Furthermore, closing element 7 may be configured to detach from contact portion 6 so as to free and/or open the designated pour opening for allowing the outpouring of the pourable product.

Preferentially, prior to detaching closing element 7 from contact portion 6, in particular for the first time, closing element 7 may be configured to seal the designated pour opening and the inner space, in particular in cooperation with contact portion 6. Afterwards, it may be possible to place closing element 7 such that closing element 7 may close the designated pour opening, but may not seal the designated pour opening and the inner space anymore.

In more detail, closing element 7 may be controllable between an active position (see FIGS. 2 to 7) in which closing element 7 is configured to cover and/or close the designated pour opening and an inactive position (not shown) in which closing element 7 is configured to free the designated pour opening. Prior to a first-time movement of closing element 7 from the active position to the inactive position, closing element 7 is configured to seal the designated pour opening and the inner space of main body 2. After the first-time movement of closing element 7 from the active position to the inactive position, it may be possible to newly place closing element 7 in the active position for covering (but not sealing) the designated pour opening.

Moreover, opening device 3 may comprise:
- a base frame 8 fixing and/or configured to fix opening device 3 to package 1, in particular main body 2, even more particular to second wall 5, and about the designated pour opening; and
- a collar 9 extending, in particular transversally, even more particular perpendicularly, from base frame 8 and defining and/or delimiting a flow channel 10.

More specifically, flow channel 10 may extend between a pouring outlet 11 (of collar 9) configured to allow for the outpouring of the pourable product and an inlet 12 (of collar 9) configured to allow for the introduction of the pourable product into flow channel 10.

In particular, closing element 7 may be arranged within flow channel 10.

Preferentially closing element 7 may be coaxially positioned with respect to collar 9.

Preferentially, closing element 7 may be interposed between pouring outlet 11 and base frame 8 when being in the active position.

Additionally, opening device 3 may also comprise a closure 13 coupled and/or couplable to collar 9 and configured to selectively open and close pouring outlet 11.

Preferentially, closing element 7 and closure 13 may be connected, in particular fixed, to one another such that any movement of closure 13 results in a concurrent movement of closing element 7. In particular, closing element 7 and closure 13 may be connected to one another by means of fusing and/or welding and/or bonding and/or molding.

Preferentially, base frame 8, collar 9 and closing element 7 may be integrally formed, in particular in a single piece. In particular, base frame 8, collar 9 and closing element 7 may be formed during a molding process, in particular during molding of opening device 3 onto the respective packaging blank.

Furthermore, closure 13 may be coupled to collar 9 after formation of base frame 8, collar 9 and closing element 7.

In other words, base frame 8, collar 9 and closing element 7 may define the first portion of opening device 3 and closure 13 may define the second portion of opening device 3. Thus, closure 13 is applied to collar 9 after molding of base frame 8, collar 9 and closing element 7.

According to some preferred non-limiting embodiments, base frame 8 or collar 9, in the specific embodiment shown collar 9, may comprise contact portion 6.

In more detail, an annular portion of collar 9 may define contact portion 6. In particular, the annular portion of collar 9 may face flow channel 10.

With particular reference to FIGS. 2 to 7, closing element 7 may comprise:
- a central main wall 17, in particular a circular main wall 17; and
- a plurality of leg elements 18, in the specific embodiment shown four, connected, in particular integrally connected to, and extending, in particular transversally, even more particular substantially perpendicularly, from central main wall 17.

In particular, leg elements 18 may extend from central main wall 17 within flow channel 10 and towards pouring outlet 11.

Furthermore, closing element 7 may also have an annular coupling membrane 19 integrally connected to central main wall 17 and rupturably connected to contact portion 6. In particular, coupling membrane 19 may be configured such that during the first-time removal of closing element 7 coupling membrane 19 ruptures so as to allow for the detachment of closing element 7 from contact portion 6.

In further detail, central main wall 17 may comprise an annular and peripheral portion 20.

Preferentially, coupling membrane 19 may radially extend from annular and peripheral portion 20. In other words, coupling membrane 19 is arranged radially outside with respect to annular and peripheral portion 20.

In more detail, leg elements 18 may be integrally connected to annular and peripheral portion 20.

Preferentially, leg elements 18 may be angularly displaced from one another about a central axis E of central main wall 17. In particular, leg elements 18 may also be unevenly distributed about central axis E. Alternatively, leg elements 18 could be equally spaced about central axis E.

More specifically, each leg element 18 may be integrally connected to central main wall 17, in particular annular and peripheral portion 20, at a respective first end portion.

Preferentially, closing element 7 may also comprise a coupling structure 21, in particular a coupling ring, (integrally) connected to leg elements 18, in particular second end portions of leg elements 18 opposite to the respective first end portions.

More specifically, coupling structure 21 may be connected, in particular welded and/or bonded and/or fused, to closure 13, in particular an inner surface of closure 13.

With particular reference to FIGS. 2 to 7, central main wall 17 may comprise:
- a plurality of radially extending ridge elements 22, in the specific embodiment shown four, each one being interposed between one respective leg element 18 and a center 23 of central main wall 17; and
- a plurality of grooves 24, in the specific embodiment shown four, each one extending between a respective pair of leg elements 18 (i.e. each groove 24 is interposed between a respective first leg element 18 and a respective second leg element 18).

In particular, by providing for ridge elements 22 it is possible to guarantee, during a molding process, a significant flow of molten polymer from a central injection point to the portions of the mold that are designed to form leg elements 18 and coupling membrane 19. In particular, it is possible to guarantee a flow of molten polymer such that the molten polymer arrives at the separation membrane from below. Furthermore, by having grooves 24 it is possible to restrict a flow of the molten polymer laterally away from the portions of the mold that form leg elements 18, further guaranteeing that the flow of molten polymer arrives at the separation membrane from below. Thereby, it is possible to restrict the flow of molten polymer to the separation membrane from above. This again ensures that the molten polymer does not arrive at the separation membrane too early from above. In this way, the separation membrane is broken by the flow of molten polymer in the desired manner and the broken portions of the separation membrane are positioned in the correct way. All this is advantageous in view of a proper application of the separation membrane onto closing element 7.

In particular, opening device 3 is molded such that the separation membrane adheres to a portion of closing element 7 facing away from the designated pour opening and/or the inner space.

Preferentially, central main wall 17 may comprise a first face 25 and a second face 26 opposite to first face 25. In particular, first face 25 and second face 26 are configured to respectively face away from and to face towards the designated pour opening.

Preferentially, opening device 3 can be molded such that the separation membrane adheres to zones of first face 25.

In particular, each leg element 18 may be connected to and may transversally, in particular substantially perpendicular, extend from first face 25.

Preferentially, each ridge element 22 may be arranged at first face 25. Alternatively, each ridge element 22 may be arranged at second face 26. According to a further alternative, each ridge element 22 may be arranged at first face 25 and second face 26.

According to some further possible non-limiting embodiments, some ridge elements 22 could be arranged at first face 25 and some ridge elements 22 could be arranged at second face 26.

In more detail, each ridge element 22 may contact the respective leg element 18, i.e. each ridge element 22 may extend from the respective leg element 18 towards center 23.

Moreover, each ridge element 22 may not extend into center 23, i.e. each ridge element 22 may be radially distanced from center 23.

More specifically, each ridge element 22 may define an elongated, elevated area of central main wall 17, in particular first face 25.

In further detail, each ridge element 22 may comprise an elongated top portion, two flanks laterally extending from the top portion (and being inclined with respect to the top portion) and a front portion (extending from the top portion at an end of the top portion adjacent to center 23). In particular, each top portion may define the maximum elevation of the respective ridge element 22. Moreover, each top portion may be arranged on a higher elevation level than portions of central main wall 17, in particular first face 25, adjacent to the respective ridge element 22.

According to the specific embodiment disclosed, one or more ridge elements 22 may be connected to one another at respective ends adjacent to center 23.

Figure 6:
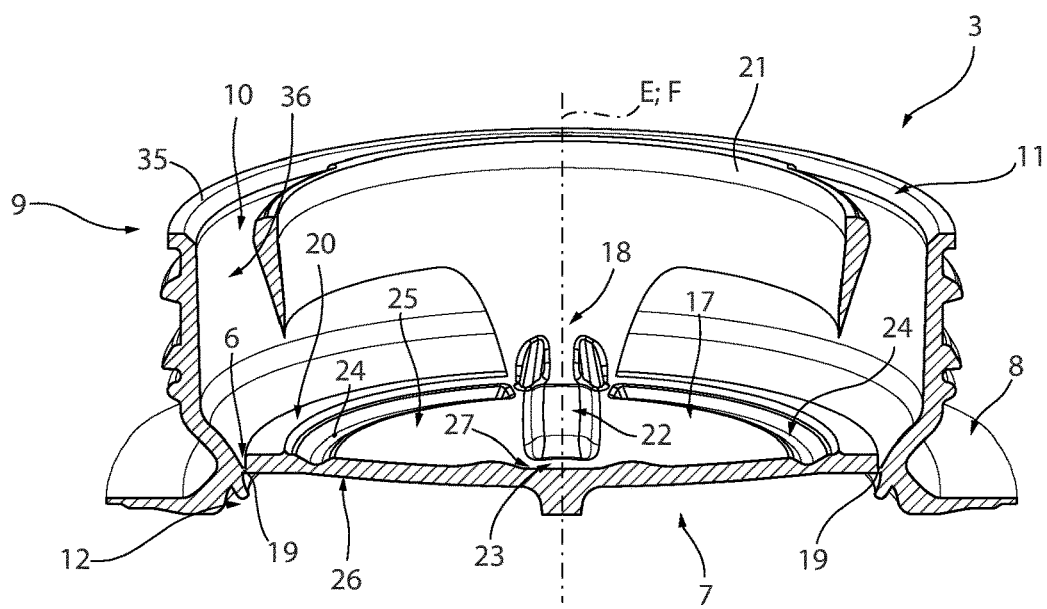
FIG. 6 is an enlarged section view of the detail of FIGS. 2, 3 and 4, with parts removed for clarity.
Figure 7:
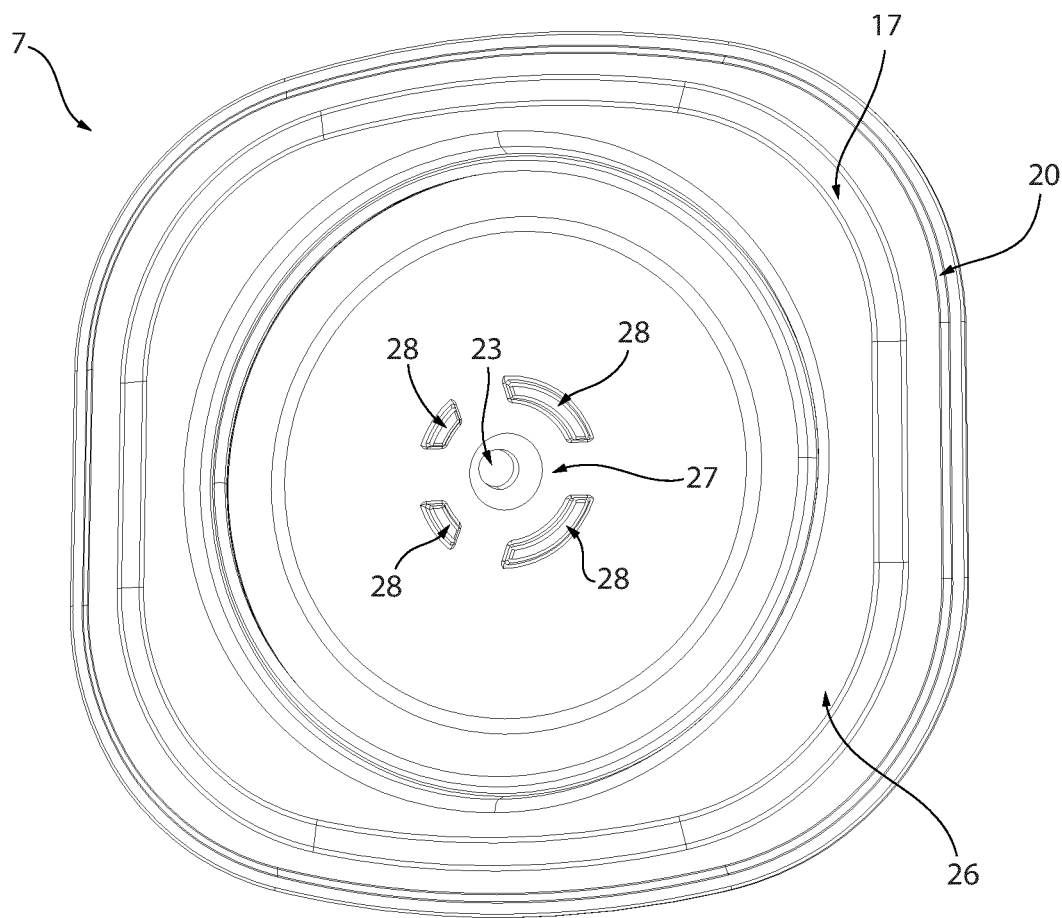
FIG. 7 is a bottom view of the detail of FIGS. 2, 3 and 4, with parts removed for clarity.

With particular reference to FIGS. 6 and 7, annular and peripheral portion 20 may comprise grooves 24.

Preferentially, grooves 24 may be angularly displaced from one another about central axis E.

According to the specific embodiment shown, grooves 24 may be unevenly distributed about central axis E. Alternatively, grooves 24 could be equally spaced about central axis E.

Moreover, grooves 24 may be angularly interposed between the respective leg elements 18.

Furthermore, each leg element 18 may be angularly interposed between two respective grooves 24.

Grooves 24 may be arc-shaped.

Moreover, grooves 24 may be laterally and/or angularly (with respect to central axis E) displaced from the respective leg elements 18 (i.e. not being in contact with the respective leg elements 18).

Preferentially, grooves 24 may be differently or equally sized. In the non-limiting specific embodiment shown, the respective grooves 24 of a first group may be equally sized with respect to one another and the respective grooves 24 of a second group may be equally sized with respect to one another.

According to the specific embodiment shown, grooves 24 may be arranged at first face 25.

In particular, grooves 24 may define depressed areas within central main wall 17.

Even more particular, each groove 24 may comprise a bottom portion, two lateral flanks extending from bottom portion, a front portion and a rear portion.

Moreover, each bottom portion of grooves 24 may be arranged on a lower elevation level than portions of central main wall 17, in particular first face 25, adjacent to grooves 24.

With particular reference to FIGS. 2 to 7, central main wall 17 may comprise a central portion 27 having center 23.

Preferentially, central main wall 17 may also comprise a plurality of auxiliary grooves 28, in particular arc-shaped auxiliary grooves 28, in the specific embodiment shown four.

In particular, auxiliary grooves 28 may be angularly displaced around central axis E.

Preferentially, auxiliary grooves 28 may be angularly displaced (with respect to central axis E) from ridge elements 22, in particular from the respective ends of ridge elements 22 adjacent to center 23. In other words, auxiliary grooves 28 and ridge elements 22 may be angularly staggered with respect to one another. In even other words, each auxiliary groove 28 may be angularly interposed between two respective ridge elements 22.

In particular, central portion 27 may have auxiliary grooves 28.

Preferentially, auxiliary grooves 28 may be arranged at second face 26. In particular, auxiliary grooves 28 may define depressed areas of second face 26.

By providing for auxiliary grooves 28, it is possible to direct the flow of the molten polymer towards the portions of the mold that form ridge elements 22. In other words, due to the auxiliary grooves 28, it is possible to increase the amount of molten polymer that flows towards the portions of the mold designated to form the ridge elements 22, while decreasing the amount of molten polymer that flows towards the other portions of the mold (adjacent to ridge elements 22) that form other parts of central main wall 17.

With particular reference to FIGS. 2 to 4 and 6, collar 9 may comprise a(n) (annular) delimiting rim 35 delimiting pouring outlet 11.

Furthermore, collar 9 may comprise an inner wall 36 delimiting flow channel 10.

Preferentially, inner wall 36 may comprise contact portion 6. In particular, prior to a first-time movement of closing element 7, closing element 7 may be rupturably connected to the portion of inner wall 36 defining contact portion 6.

Moreover, inner wall 36 may comprise a plurality of slots 37, in the specific embodiment shown eight. In particular, each slot 37 may extend towards delimiting rim 35 and/or pouring outlet 11. Even more particular, each slot 37 may extend from a position adjacent to contact portion 6 and towards delimiting rim 35 and/or pouring outlet 11.

Furthermore, the plurality of slots 37 may define a plurality of pairs of slots 37.

Preferentially, each pair of slots 37 may be arranged adjacent to one respective leg element 18.

Alternatively, or in addition, each pair of slots 37 may be arranged such that the respective slots 37 interpose a projection of the respective leg element 18 onto inner wall 36 between one another.

In particular, slots 37 limit the flow of the molten polymer towards the portions of the mold, that form leg elements 18 from a side opposite to the side that faces the respective ridge elements 22. Also in this way, it is possible to ensure a correct flow of the molten polymer such that the molten polymer arrives at the separation membrane from below.

In more detail, collar 9 may extend along a longitudinal axis F, in particular parallel, even more particular coaxial, to central axis E.

Preferentially, slots 37 and/or the pairs of slots 37 may be angularly displaced around longitudinal axis F. In particular, the pairs of slots 37 are equally spaced around longitudinal axis F.

According to some preferred non-limiting embodiments, closure 13 may be movable between:
- a closing configuration, in which closure 13 covers pouring outlet 11, in particular for impeding an outflow of the pourable product out of pouring outlet 11; and
- an opening configuration in which closure 13 may be detached from pouring outlet 11, in particular for allowing an outflow of the pourable product through pouring outlet 11.

Preferentially, closure 13 may be reversibly moved between the closing configuration and the opening configuration.

According to some preferred non-limiting embodiments, closing element 7 may be connected, in particular fused and/or welded and/or bonded, to closure 13 such that movement of closure 13 between the closing configuration and the opening configuration may result in movement of closing element 7 between respectively the active position and the inactive position.

It should be noted that package 1 may be immediately after its formation arranged in an initial configuration in which closure 13 and closing element 7 may be respectively in the closing configuration and in the active position. Package 1 may be distributed and/or sold to a user while being in the initial configuration.

In use, a user receives package 1 with closure 13 and closing element 7 being respectively in the closing configuration and the active position so as to respectively cover pouring outlet 11 and the designated pour opening.

Prior to the first control of closure 13 from the closing configuration to the opening configuration and of closing element 7 from the active position to the inactive position, closing element 7, in particular through annular coupling membrane 19, is fixed to contact portion 6.

The user, in order to access the pourable product, needs to control closure 13 from the closing configuration to the opening configuration leading to a movement of closing element 7 from the active position to the inactive position and a rupturing of closing element 7, in particular of coupling membrane 19, from contact portion 6. This then allows the pourable product to flow from the inner space through flow channel 10 and out of flow channel 10 through pouring outlet 11.

Each time closing element 7 is arranged again in the active position (by moving closure 13 in the closing configuration) closing element 7 covers the designated pour opening.

According to another aspect of the present invention, opening device 3 may be coupled to main body 2 by means of a molding process. In particular, opening device 3 may be coupled to main body 2 by molding the first portion of opening device 3 to the respective packaging blank.

In order to do so, a mold needs to be provided, which is configured to allow for molding of opening device 3 onto main body 2 and/or the packaging blank. In more detail, the mold may be configured to allow for molding and forming the first portion of opening device 3.

In particular, the mold may be configured to allow for the formation of base frame 8, collar 9 and closing element 7.

In more detail, the mold may be designed such to allow for the formation of leg elements 18, central main wall 17, contact portion 6, coupling membrane 19. In even more detail, the mold may be designed to allow the formation of ridge elements 22 and grooves 24. Additionally, the mold may be designed to allow the formation of auxiliary grooves 28 and/or slots 27.

Advantageously, ridge elements 22 and grooves 24, in particular also auxiliary grooves 28 and/or slots 27, may allow to design the mold such that a flow of molten polymer within the mold guarantees a correct arrangement of the separation membrane on closing element 7.

In particular, the mold may be designed such that the injection point of the molten polymer is at the area, which forms central portion 27 and/or center 23.

The advantages of opening device 3 and/or of package 1 according to the present invention will be clear from the foregoing description.

In particular, by providing for closing element 7 comprising central main wall 17 having ridge elements 22 and grooves 24 it is possible to ensure (during e.g. a molding process) that the separation membrane correctly adheres to closing element 7. In more detail, ridge elements 22 and grooves 24 ensure that the flow of the molten polymer is such that the separation membrane correctly ruptures during the molding process.

Another advantage resides in providing for auxiliary grooves 28 and/or slots 37, which allow to further improve the flow of a molten polymer during a molding process in order to further favor a correct coupling of the separation membrane to closing element 7.

Clearly, changes may be made to opening device 3 and/or package 1 as described herein without, however, departing from the scope of protection as defined in the accompanying claims.

The invention claimed is:

1. An opening device for a package having a designated pour opening and being filled with a pourable product;
   the opening device comprises a contact portion and a closing element attached to the contact portion and configured to close the designated pour opening;
   wherein the closing element comprises:
   a central main wall; and
   a plurality of leg elements connected to and extending from the central main wall;
   wherein the central main wall comprises:
   a plurality of radially extending ridge elements, each one being interposed between one respective leg element and a center of the central main wall; and
   a plurality of grooves, each one extending between one respective pair of leg elements.

2. The opening device according to claim 1, wherein each ridge element contacts the respective leg element.

3. The opening device according to claim 1, wherein the leg elements are angularly displaced from one another about a central axis of the central main wall.

4. The opening device according to claim 1, wherein the leg elements are connected to a peripheral portion of the central main wall; and
   wherein the peripheral portion comprises the grooves.

5. The opening device according to claim 1, wherein the grooves are arc-shaped.

6. The opening device according to claim 1, wherein the central main wall comprises a first face;
   wherein the leg elements extend from the first face of the central main wall; and
   wherein the grooves are arranged at the first face.

7. The opening device according to claim 1, wherein the central main wall comprises a central portion having a plurality of auxiliary grooves;
wherein the auxiliary grooves are angularly displaced from the ridge elements.

8. The opening device according to claim 7, wherein the central main wall comprises a first face and a second face;
wherein the leg elements transversally extend from the first face of the central main wall; and
wherein the auxiliary grooves are arranged at the second face.

9. The opening device according to claim 1, wherein the closing element further comprises an annular coupling membrane radially protruding from the central main wall and detachably connecting the closing element to the contact portion.

10. The opening device according to claim 1, and further comprising a base frame configured to fix the opening device to the package around the designated pour opening and a collar extending from the base frame and defining a flow channel;
wherein the collar or the base frame comprises the contact portion.

11. The opening device according to claim 10, wherein the collar comprises an inner wall;
wherein the inner wall comprises a plurality of slots extending towards a delimiting rim, the delimiting rim delimiting a pouring outlet for the pourable product.

12. The opening device according to claim 11, wherein the plurality of slots defines a plurality of pairs of slots;
each pair of slots being arranged adjacent to one respective leg element; and/or
each pair of slots being arranged such that interposed between the respective slots is a projection of the respective leg element onto the inner wall.

13. A package filled and/or fillable with a pourable product and comprising at least one opening device according to claim 1.

14. The package according to claim 13, wherein the package comprises a main body having a designated pour opening and being formed from a multilayer composite packaging material, wherein the opening device is coupled onto the main body and about the designated pour opening.

15. The package according to claim 13, wherein the opening device is molded to a main body of the package and/or onto a precursor of the package.

* * * * *